US011391412B2

(12) United States Patent
Patel

(10) Patent No.: US 11,391,412 B2
(45) Date of Patent: Jul. 19, 2022

(54) SQUARE POLE ADAPTERS FOR TELECOMMUNICATIONS EQUIPMENT MOUNTS

(71) Applicant: CommScope Technologies LLC, Hickory, NC (US)

(72) Inventor: Jignesh Patel, Plano, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/173,439

(22) Filed: Feb. 11, 2021

(65) Prior Publication Data
US 2021/0301974 A1 Sep. 30, 2021

Related U.S. Application Data

(60) Provisional application No. 63/001,731, filed on Mar. 30, 2020.

(51) Int. Cl.
H01Q 1/12 (2006.01)
F16M 13/02 (2006.01)
F16B 2/12 (2006.01)
F16B 2/06 (2006.01)
E04H 12/22 (2006.01)

(52) U.S. Cl.
CPC .......... F16M 13/022 (2013.01); F16B 2/065 (2013.01); E04H 12/2284 (2013.01); F16B 2/12 (2013.01); F16M 13/025 (2013.01); H01Q 1/125 (2013.01)

(58) Field of Classification Search
CPC ...... F16M 13/02; F16M 11/04; F16M 13/025; F16B 2/065; F16B 2/12; H01Q 1/12; H01Q 1/125; H01Q 1/1228; H01Q 9/34; E04H 12/2284
See application file for complete search history.

(56) References Cited

U.S. PATENT DOCUMENTS 3,604,676 A * 9/1971 Weber .................... F16L 3/1075
248/231.51
4,320,882 A * 3/1982 Bachle .................... F16L 25/04
248/70

(Continued)

FOREIGN PATENT DOCUMENTS

CN 204118232 U 1/2015
WO 9945310 9/1999
WO 2018048624 A1 3/2018

OTHER PUBLICATIONS

PCT Notification of Transmittal of the International Search Report and the Written Opinion of the International Searching Authority, or the Declaration, dated May 7, 2021 for corresponding PCT International Application No. PCT/US2021/017557.

Primary Examiner — Tan Le
(74) Attorney, Agent, or Firm — Myers Bigel, P.A.

(57) ABSTRACT

The present disclosure describes an adapter for mounting pole top mounts to a square mounting pole. A square pole adapter kit includes two threaded rods and two adapters. Each adapter includes a main body, top and bottom members, and a pair of flanges. The top and bottom members of the adapters include triangular recesses that are sized and configured to receive a corner of a square mounting pole. Square pole adapter systems and assemblies are also provided.

18 Claims, 14 Drawing Sheets

(56) References Cited

U.S. PATENT DOCUMENTS

| | | | |
|---|---|---|---|
| 6,262,691 B1* | 7/2001 | Austin | H01Q 1/1228 |
| | | | 343/890 |
| 6,283,425 B1* | 9/2001 | Liljevik | F16M 11/10 |
| | | | 403/399 |
| 6,719,255 B2* | 4/2004 | Chen | H04R 1/026 |
| | | | 248/323 |
| 9,136,582 B2* | 9/2015 | Lewry | H01Q 1/125 |
| 2001/0015707 A1 | 8/2001 | Oby | |
| 2012/0299796 A1 | 11/2012 | Angseryd | |
| 2016/0211568 A1* | 7/2016 | Lettkeman | H01Q 1/12 |

* cited by examiner

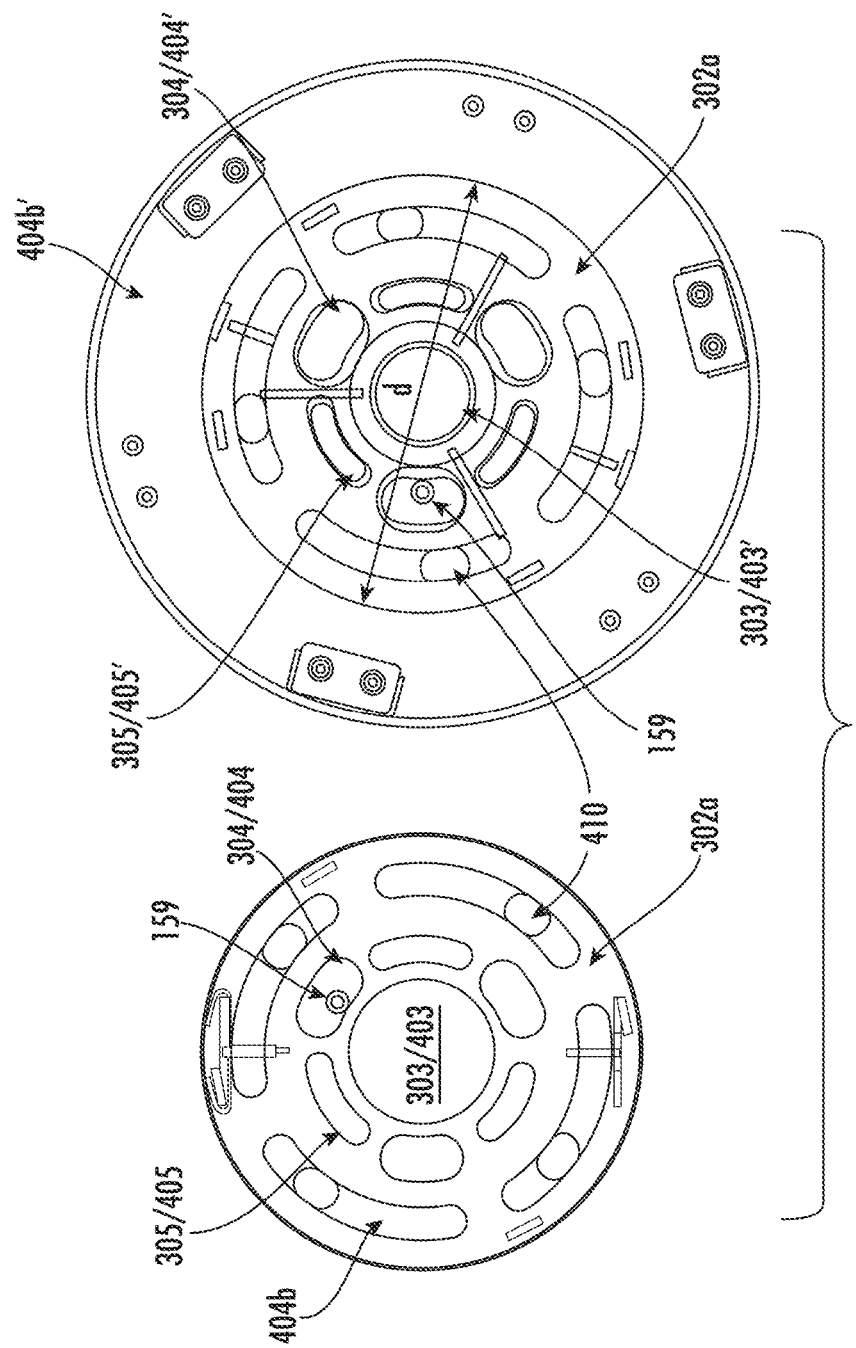

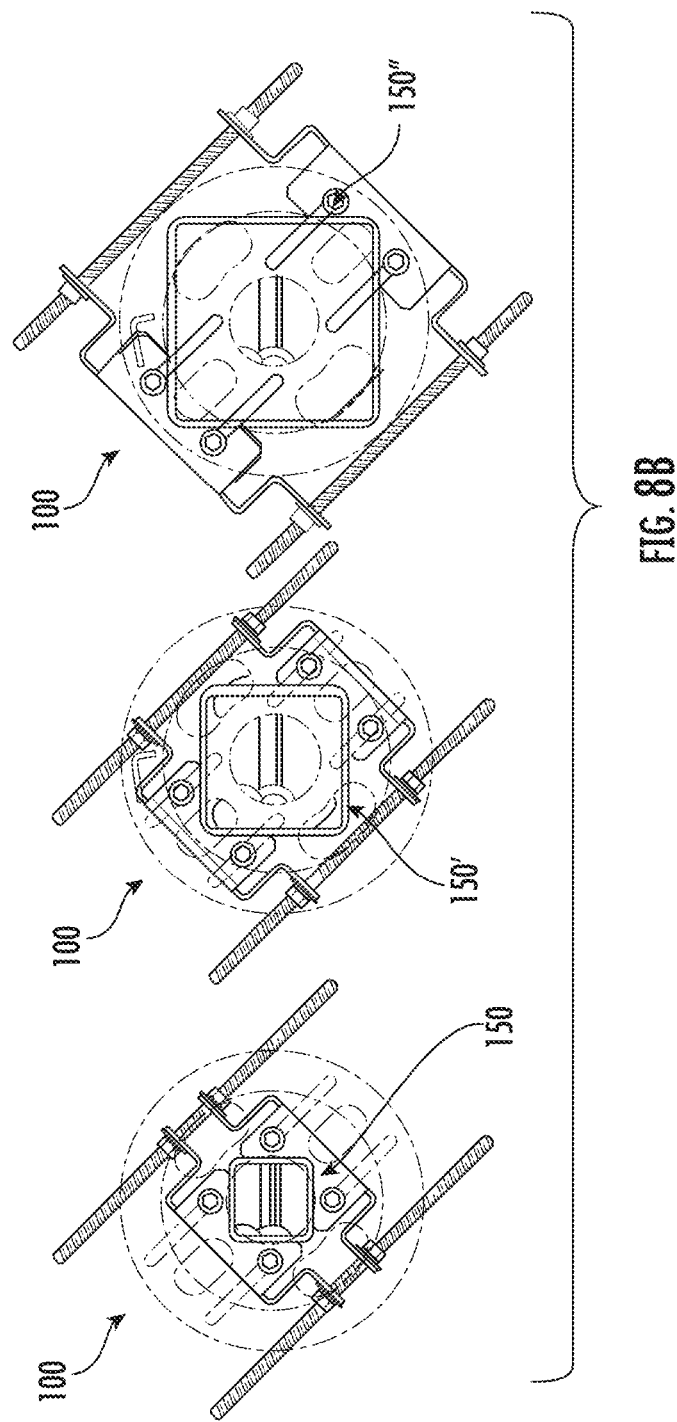

SQUARE POLE ADAPTERS FOR TELECOMMUNICATIONS EQUIPMENT MOUNTS

RELATED APPLICATION(S)

The present application claims priority to and the benefit of U.S. Provisional Patent Application Ser. No. 63/001,731, filed Mar. 30, 2020, the disclosure of which is hereby incorporated herein in its entirety.

FIELD

The present application is directed generally toward telecommunications equipment, and more particularly, square pole adapters for telecommunications equipment mounts.

BACKGROUND

Currently, a majority of pole top telecommunications equipment is designed to be mounted on top of a cylindrical mounting pole (e.g., a utility pole). Thus, a majority of pole top equipment and mounts available today have circular mounting plates that may be easily installed on the top of the pole. However, there are some situations when a technician may need to install the same telecommunications equipment on the top of a square mounting pole. There may be a need for a device that would allow current available pole top telecommunications equipment to be mounted to a square mounting pole without the need to modify the circular mounting plates of the telecommunications equipment.

SUMMARY

A first aspect of the present invention is directed to a square pole adapter kit. The kit may include two threaded rods and two adapters. Each thread rod may have corresponding nuts and washers. Each adapter may include a main body, top and bottom members, and a pair of flanges. The top member of each adapter may be integral with the main body and bent inwardly such that the top member extends generally perpendicularly to the main body. The top member includes a triangular recess and a plurality of apertures with each aperture being configured to receive a respective fastener from a pole top mount. The bottom member of each adapter may be integral with the main body and bent inwardly such that the bottom member extends generally perpendicularly to the main body and generally parallel with the top member. The bottom member includes a triangular recess and a plurality of apertures with each aperture configured to receive the fastener from the pole top mount. The flanges extend outwardly from opposing sides of the main body and each flange includes an aperture sized and configured to receive a threaded rod. The triangular recesses of one adapter are sized and configured to receive a corner of a square mounting pole and the triangular recesses of the other adapter are sized and configured to receive an opposing corner of the square mounting pole.

Another aspect of the present invention is directed to a square pole adapter system. The system may include a pole top mount and a square pole adapter kit. The pole top mount may include a top mounting plate and a bottom mounting plate coupled to and spaced apart from the top mounting plate by a plurality of support members. The top mounting plate may have a first routing aperture located in the center of the plate and a first plurality of elongated apertures located circumferentially around the first routing aperture. The bottom mounting plate may have a corresponding second routing aperture in the center of the plate and a second plurality of elongated apertures located circumferentially around the second routing aperture. The bottom mounting plate may further include two pairs of elongated slots, each pair of slots extending outwardly from opposing sides of the second routing aperture. Each elongated slot may be sized and configured to receive a fastener. The adapter kit may include two threaded rods and two adapters. Each thread rod may have corresponding nuts and washers. Each adapter may include a main body, top and bottom members, and a pair of flanges. The top member may be integral with the main body and bent inwardly such that the top member extends generally perpendicularly to the main body. The top member includes a triangular recess and a plurality of apertures with each aperture being configured to receive the fastener from the bottom plate of the pole top mount. The bottom member may be integral with the main body and bent inwardly such that the bottom member extends generally perpendicularly to the main body and generally parallel with the top member. The bottom member includes a triangular recess and a plurality of apertures with each aperture configured to receive the fastener from the bottom plate of the pole top mount. The flanges extend outwardly from opposing sides of the main body and each flange includes an aperture sized and configured to receive a threaded rod. The triangular recesses of one adapter are sized and configured to receive a corner of a square mounting pole and the triangular recesses of the other adapter are sized and configured to receive an opposing corner of the square mounting pole. Each fastener is inserted through a slot in the bottom mounting plate of the pole top mount and corresponding apertures in the top and bottom members of an adapter, thereby securing the adapters to the bottom mounting plate of the pole top mount.

Another aspect of the present invention is directed to a square pole adapter system assembly. The assembly may include a square mounting pole, a pole top mount, and a square pole adapter kit. The pole top mount may include a top mounting plate and a bottom mounting plate coupled to and spaced apart from the top mounting plate by a plurality of support members. The top mounting plate may have a first routing aperture located in the center of the plate and a first plurality of elongated apertures located circumferentially around the first routing aperture. The bottom mounting plate may have a corresponding second routing aperture in the center of the plate and a second plurality of elongated apertures located circumferentially around the second routing aperture. The bottom mounting plate further includes two pairs of elongated slots with each pair extending outwardly from opposing sides of the second routing aperture. A fastener may be inserted through each elongated slot. The square pole adapter kit may include two threaded rods and two adapters. Each thread rod may have corresponding nuts and washers. Each adapter may include a main body, top and bottom members, and a pair of flanges. The top member may be integral with the main body and bent inwardly such that the top member extends generally perpendicularly to the main body. The top member includes a triangular recess and a plurality of apertures with each aperture receives a respective fastener extending from the bottom plate of the pole top mount. The bottom member may be integral with the main body and bent inwardly such that the bottom member extends generally perpendicularly to the main body and generally parallel with the top member. The bottom member includes a triangular recess and a plurality of apertures with each aperture receiving a respective fastener extending from the bottom plate of the pole top mount and through the apertures of the top member, thereby securing the adapters to the pole top mount. The flanges extend outwardly from opposing sides of the main body and each flange includes an aperture that receives a threaded rod. The triangular recesses of one adapter receive a corner of the square mounting pole and the triangular recesses of the other adapter receive an opposing corner of the square mounting pole. The corresponding nuts and washers are tightened on the respective threaded rods and against the flanges of the adapters, thereby securing the square pole adapter kit to the square mounting pole.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE FIGURES

FIG. 6 is a top view comparing the cable routing and mounting patterns for a 12-inch pole top adapter system and an 18-inch pole top adapter system.

FIG. 8B is a bottom sectional view of each adapter system assembly of FIG. 8A taken along line 8B-8B.

DETAILED DESCRIPTION

Figure 1:
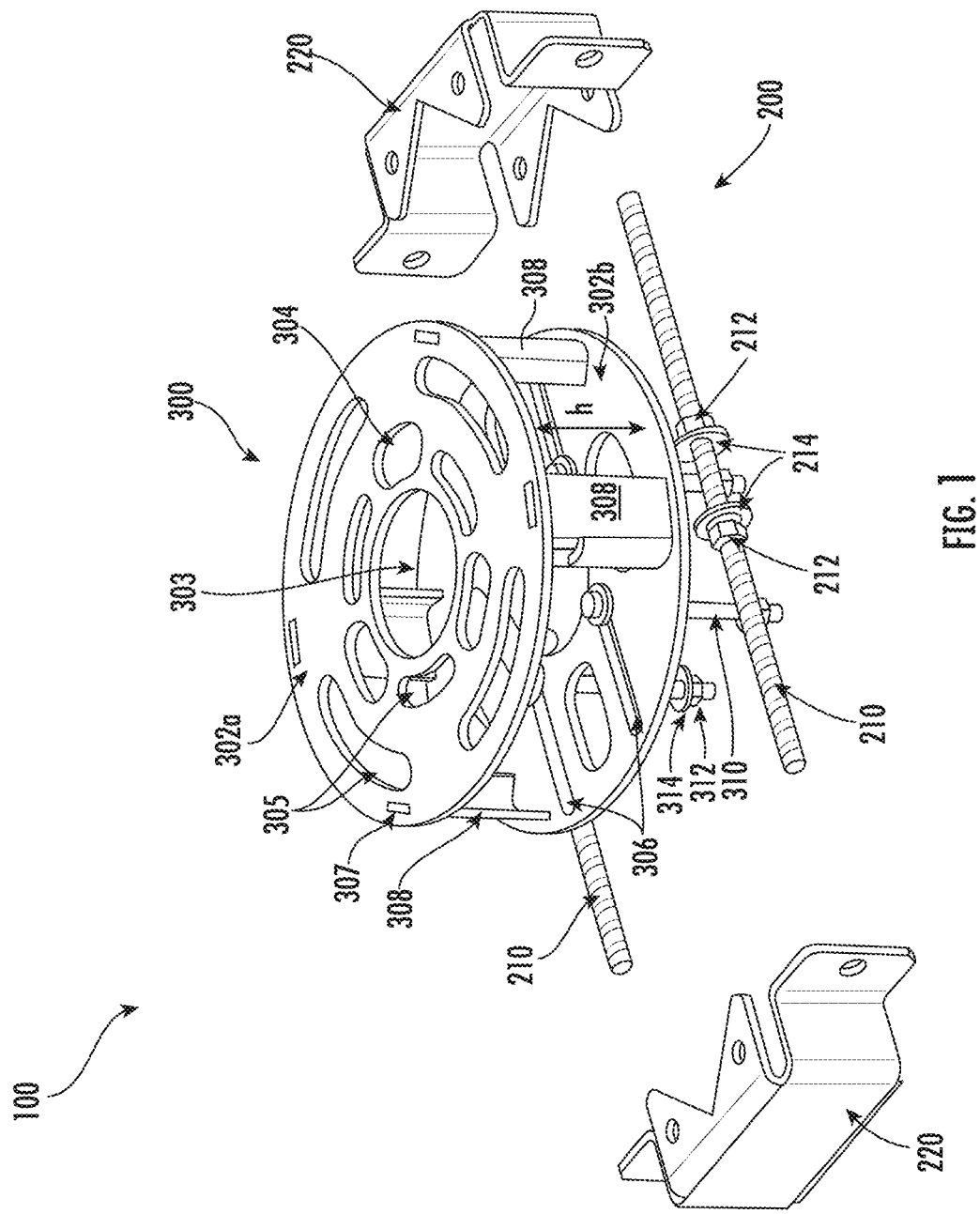
FIG. 1 is a perspective view of an adapter system for a square pole according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10", 10'").

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Pursuant to embodiments of the present invention, adapter kits are provided that may allow a pole top mount (and associated telecommunications equipment) to be mounted on top of a square mounting pole. Square pole adapter systems and assemblies are also provided. Embodiments of the present invention will now be discussed in greater detail with reference to FIGS. 1-11.

Referring to FIG. 1, a square pole adapter system 100 according to embodiments of the present invention is illustrated. The square pole adapter system 100 may comprise a pole top mount 300 and a square pole adapter kit 200. As discussed herein, the square pole adapter system 100 of the present invention may be used to mount telecommunications equipment 400, 400' on top of a range of different sized square mounting poles 150. For example, in some embodiments, the square pole adapter system 100 may be used for square mounting poles 150 having dimensions ranging from about 3.5 inches square to about 8.5 inches square.

As shown in FIG. 1, in some embodiments, the pole top mount 300 may include a top mounting plate 302a and a bottom mounting plate 302b that are spaced apart by a plurality of support members 308. In some embodiments, the mounting plates 302a, 302b may be circular in shape and may have a diameter (d) in the range of about 8 inches to about 18 inches. The top mounting plate 302a is spaced apart a distance (h) from the bottom mounting plate 302b. As shown in FIG. 1, in some embodiments, the distance (h) between the mounting plates 302a, 302b is approximately equal to the height of the support members 308 located therebetween. The support members 308 are circumferentially spaced apart from each other and provide structural support to the pole top mount 300. In some embodiments, the ends of each support member 308 may be secured adjacent to an outer periphery of the top and bottom mounting plates 302a, 302b, respectively. In some embodiments, the ends of each support member 308 may be secured within a respective slot 307 in the top and bottom mounting plates 302a, 302b. In some embodiments, the ends of each support member 308 may be secured to the top and bottom mounting plates 302a, 302b via welding.

In some embodiments, the top and bottom mounting plates 302a, 302b of the pole top mount 300 may each comprise a routing aperture 303 located in the center of the plate 302a, 302b. Each routing aperture 303 is sized and configured such that a plurality of cables 159 may be routed into and/or through the pole top mount 300 (see, e.g., 4). In some embodiments, each routing aperture 303 is sized and configured to receive and secure a mounting member 420' of the telecommunications equipment 400 that may be mounted to the pole top mount 300 (see, e.g., FIG. 5), through which, in some embodiments, cables may be routed.

In some embodiments, the top and bottom mounting plates 302a, 302b further comprise a plurality of mounting apertures 304. The mounting apertures 304 may be elongated slots that extend circumferentially around the routing aperture 303 in each mounting plate 302a, 302b. Each mounting aperture 304 is configured to receive a fastener 410 (e.g., a bolt) (see, e.g., FIGS. 4 and 6). The mounting apertures 304 allow the pole top mount 300 to be secured to a mounting structure 150 and/or allow telecommunications equipment 400 be secured to the pole top mount 300. In some embodiments, the top and bottom mounting plates 302a, 302b may further comprise a plurality of cable apertures 305. Similar to the mounting apertures 304, the cable apertures 305 may be elongated slots that extend circumferentially around the central routing aperture 303 in each mounting plate 302a, 302b. Each cable aperture 305 may be sized and configured such that a cable 159 may be inserted there through (see, e.g., FIG. 6).

Figure 4:
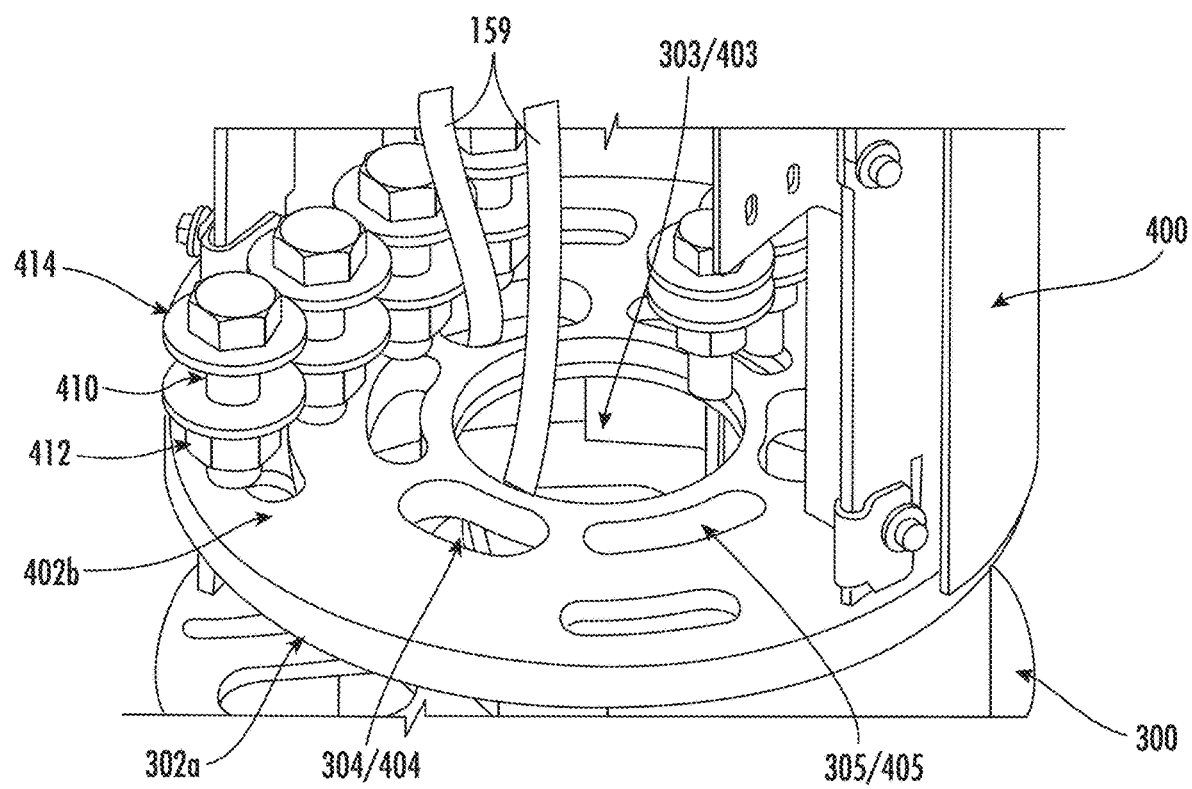
FIG. 4 is an enlarged top perspective view of a lower plate of a pole-top module that shows the cable routing and mounting aperture patterns for the 12-inch pole top adapter system of FIG. 1.
Figure 5:
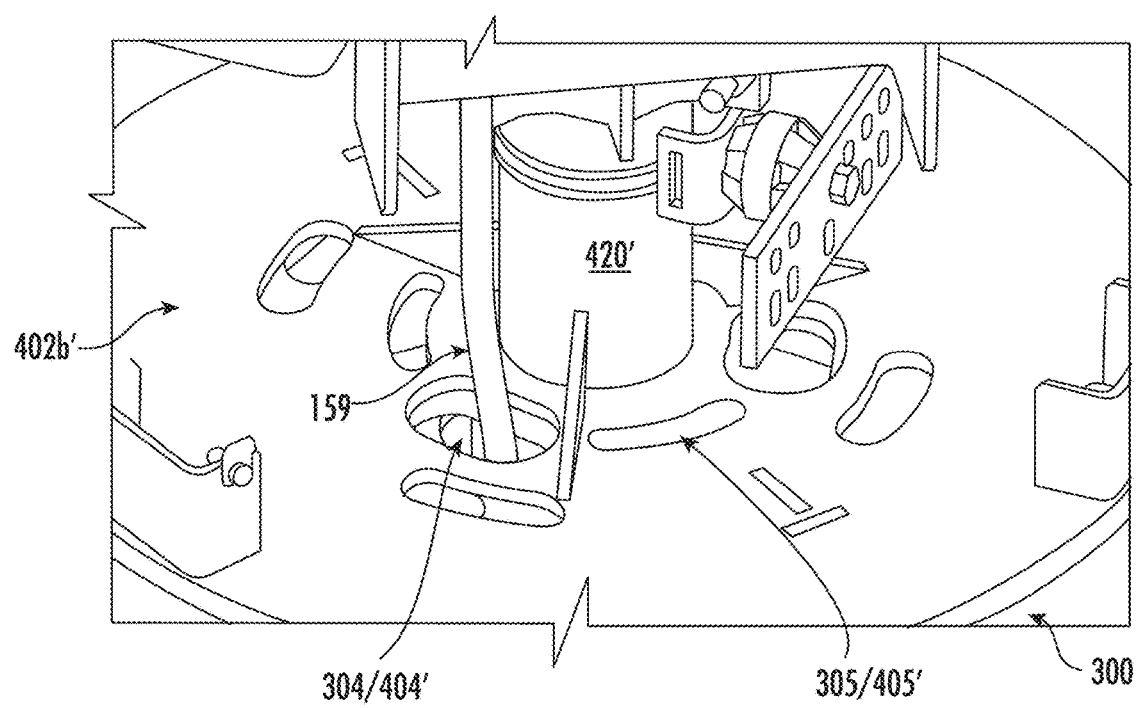
FIG. 5 is an enlarged top perspective view of a lower plate of a pole-top module that shows the cable routing and mounting aperture patterns for an 18-inch pole top adapter system of FIG. 1.

As shown in FIG. 1 and FIGS. 4-6, in some embodiments, the cable apertures 305 may be wider than the mounting apertures 304, for example, to accommodate the diameter of a cable 159 versus the diameter of a bolt (i.e., fastener 410). As shown in FIGS. 4-6, the cable apertures 305 and mounting apertures 304 are positioned and configured in the top and bottom mounting plates 302a, 302b such that the pole top mount 300 can accommodate different sized pole-top modules for telecommunications equipment 400, 400'. For example, FIGS. 4 and 6 illustrate the alignment of cable and mounting apertures 304, 305 in the top mounting plate 302a of the pole top mount 300 with the cable and mounting apertures 404, 405 in the bottom mounting plate 402b of a 12-inch pole-top module for telecommunications equipment 400. FIGS. 5 and 6 illustrate the alignment of cable and mounting apertures 304, 305 in the top mounting plate 302a of the pole top mount 300 with the cable and mounting apertures 404', 405' in the bottom mounting plate 402b of 18-inch pole-top module for telecommunications equipment 400'. Thus, as shown in FIGS. 4-6, the square pole adapter system 100 of the present invention (i.e., the cable and mounting apertures 304, 305 of the pole top mount 300) may be utilized for a variety of different sized pole-top modules for telecommunications equipment 400, 400' (e.g., 12-inch and 18-inch).

As shown in FIG. 1 and FIGS. 7A-7F, in some embodiments, the bottom mounting plate 302b further comprises two pairs of elongated slots 306. Each pair of slots 306 extends outwardly from opposing sides of the central routing aperture 303. Each elongated slot 306 is sized and configured to receive a fastener 310 (e.g., a bolt). As discussed further herein, the elongated slots 306 allow the pole top mount 300 to be adjustable to fit on top of different sized square mounting poles 150.

The square pole adapter system 100 of the present invention further includes a square pole adapter kit 200. The square pole adapter kit 200 may include two threaded rods 210 and a pair of adapters 220. Each thread rod 210 has corresponding nuts 212 and washers 214 that may be used to help secure the adapters 220 (and pole top mount 300) to a square mounting pole 150.

Figure 2A:
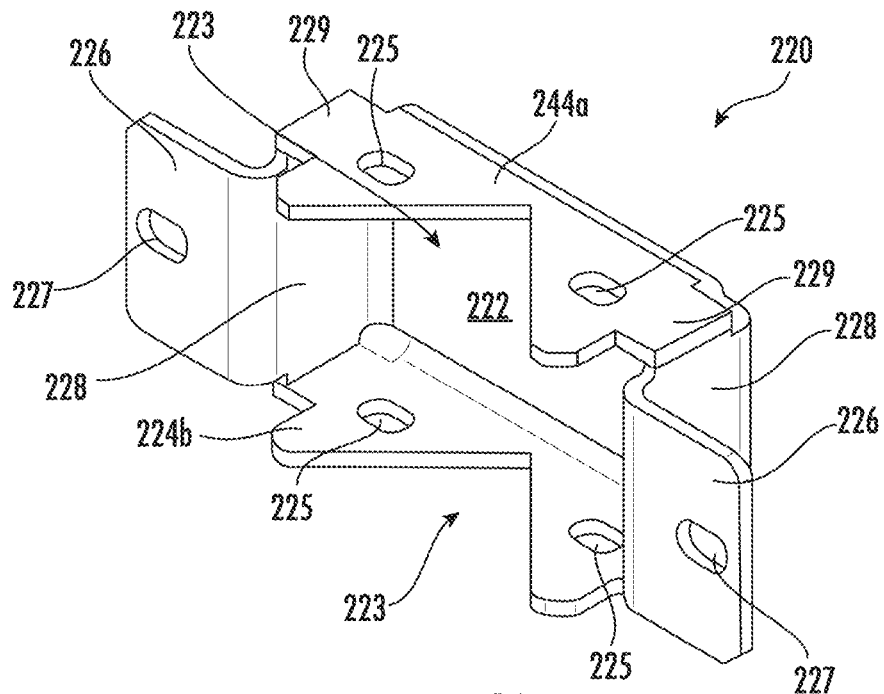
FIG. 2A is a perspective view of an exemplary adapter for a 12-inch pole top that may be used with the adapter system of FIG. 1 according to embodiments of the present invention.
Figure 2B:
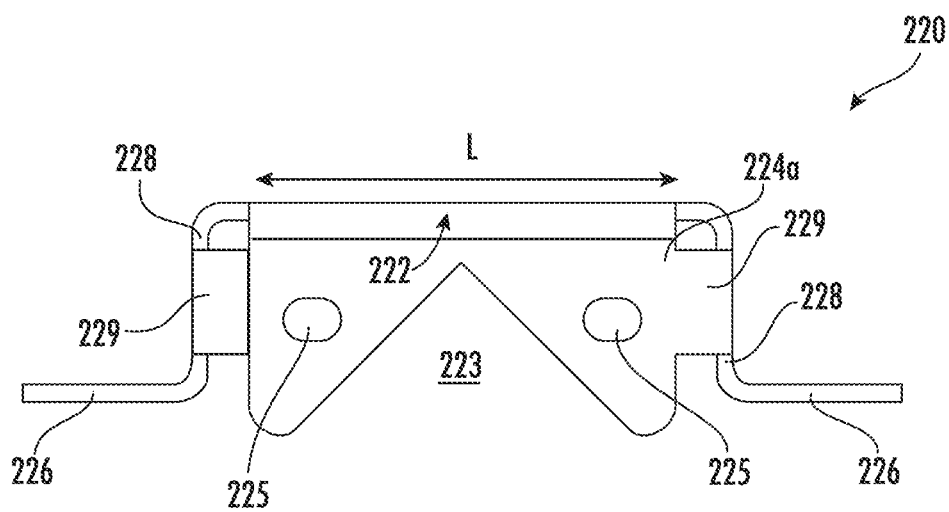
FIG. 2B is a top view of the adapter of FIG. 2A.

Referring now to FIGS. 2A-2B, an exemplary adapter 220 that may be used with the square pole adapter kit 200 of the present invention is illustrated. The adapter 220 comprises a main body 222, a top member 224a, a bottom member 224b, and a pair of flanges 226. The top member 224a may be integral with the main body 222 and bent inwardly such that the top member 224a extends generally perpendicularly to the main body 222. As shown in FIGS. 2A-2B, the top member comprises a triangular recess 223 and a plurality of apertures 225 on opposing sides of the triangular recess 223. As discussed in further detail below, each aperture 225 is sized and configured to receive a respective fastener 310 from the pole top mount 300.

Similar to the top member 224a, the bottom member 224b of the adapter 220 may be integral with the main body 222 and bent inwardly such that the bottom member 224b extends generally perpendicularly to the main body 222 and extends generally parallel with the top member 224a. Also mirroring the top member 224a, the bottom member 224b comprises a triangular recess 223 and a plurality of apertures 225 sized and configured to receive a respective fastener 310 from the pole top mount 300. The triangular recesses 223 of the top and bottom members 224a, 224b are sized and configured to receive a corner edge of a square mounting pole 150.

The flanges 226 extend outwardly from opposing sides of the main body 222 of the adapter 220. Each flange 226 comprises an aperture 227 that is sized and configured to receive a respective threaded rod 210. In some embodiments, the main body 222, top and bottom members 224a, 224b, and flanges 226 may be bent from a single piece of steel to form monolithic adapter 220.

Figure 3A:
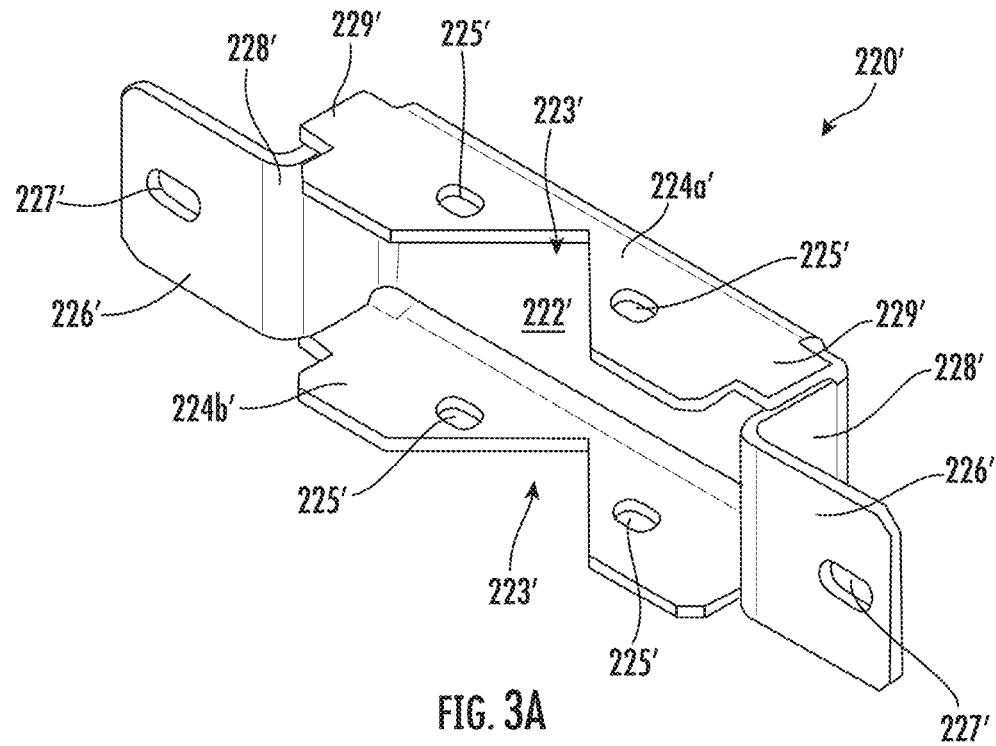
FIG. 3A is a perspective view of an exemplary adapter for an 18-inch pole top that may be used with the adapter system of FIG. 1 according to embodiments of the present invention.
Figure 3B:
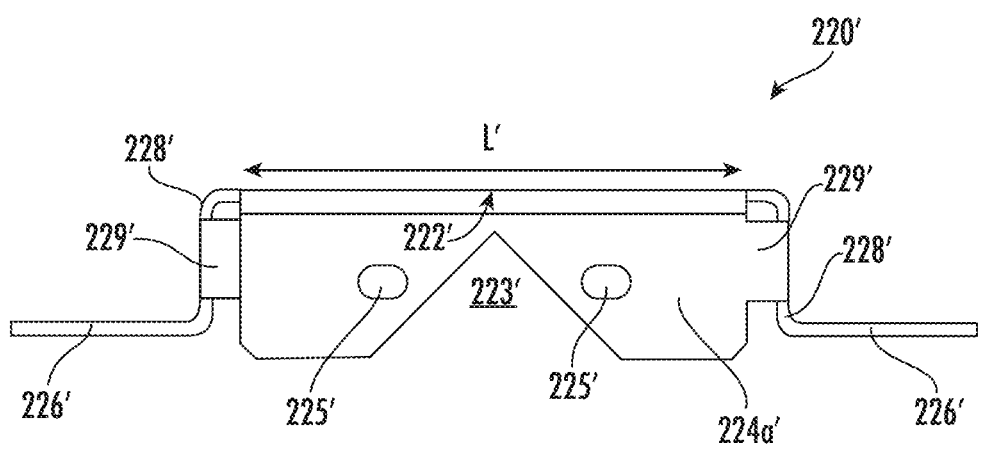
FIG. 3B is a top view of the larger adapter of FIG. 3A.

The adapters 220 illustrated in FIGS. 2A-2B may be used with square mounting poles 150 having dimensions up to 6 inches square. Referring to FIGS. 3A-3B, an alternative adapter 220' that may be used with the square pole adapter kit 200 of the present invention is illustrated. The adapter 220' shown in FIGS. 3A-3B is similar to adapter 220 described herein except for the adapter 220' has a longer main body 222' than the main body 222 of adapter 220. The longer main body 222' allows the adapter 220' to be used with square mounting poles 150 having dimensions greater than 6 inches square. For example, in some embodiments, adapter 220 may have a main body 222 having a length (l) in the range of about 4 inches to about 6 inches and the adapter 220' may have a main body 222' having a length (l') in the range of about 6 inches to about 9.5 inches.

Using the square pole adapter kit 200, a pole top mount 300 may be secured on top of a square mounting pole 150 (see, e.g., FIGS. 7A-10B). First, fasteners 310 (e.g., bolts) are each inserted through a respective slot 306 in the bottom mounting plate 302b of the pole top mount 300. Each fastener 310 is further inserted through respective apertures 225 in both the top and bottom members 224a, 224b of the adapters 220 such that the triangular recesses 223 of each adapter 220 face toward each other (i.e., the triangular recesses 223 open inward toward the routing apertures 303 of the pole top mount 300). The fasteners 310 are partially tightened (e.g., with nuts 312 and washers 314, see e.g., FIG. 1) such that each adapter 220 is secured to the bottom mounting plate 302b of the pole top mount 300, but still loose enough such that the fasteners 310 are able to slide within their respective slots 306 in the bottom mounting plate 302b (and thereby providing the ability to adjust the adapters 220 to fit around the desired square mounting pole 150).

Next, the bottom mounting plate 302b (with the adapters 220 attached) is placed on top of the square mounting pole 150 and the threaded rods 210 are inserted through corresponding apertures 227 in opposing adapters 220. The triangular recesses 223 of each adapter 220 are aligned with opposing corners of the square mounting pole 150 and slid toward each other (i.e., the fasteners 310 are slid within the slots 306 in the bottom mounting plate 302b) until the opposing corners of the square mounting pole 150 are received securely within a respective triangular recess 223. The nuts 212 and washers 214 are threaded onto the ends of the threaded rods 210 that extend through the flanges 226 of the adapters until the nuts 212 and washers 214 are tightened against the flanges 226 of the adapters 220, thereby securing the adapters 220 against the square mounting pole 150 (i.e., securing opposing corners of the square mounting pole 150 within the triangular recesses 223 of the adapters 220) (see, e.g., FIGS. 7A-7F, 8B, 9B, and 10A-10B). Finally, the fasteners 310 are fully tightened, thereby securing the pole top mount 300 to the adapters 220 and to the top of a square mounting pole 150.

Figure 7A:
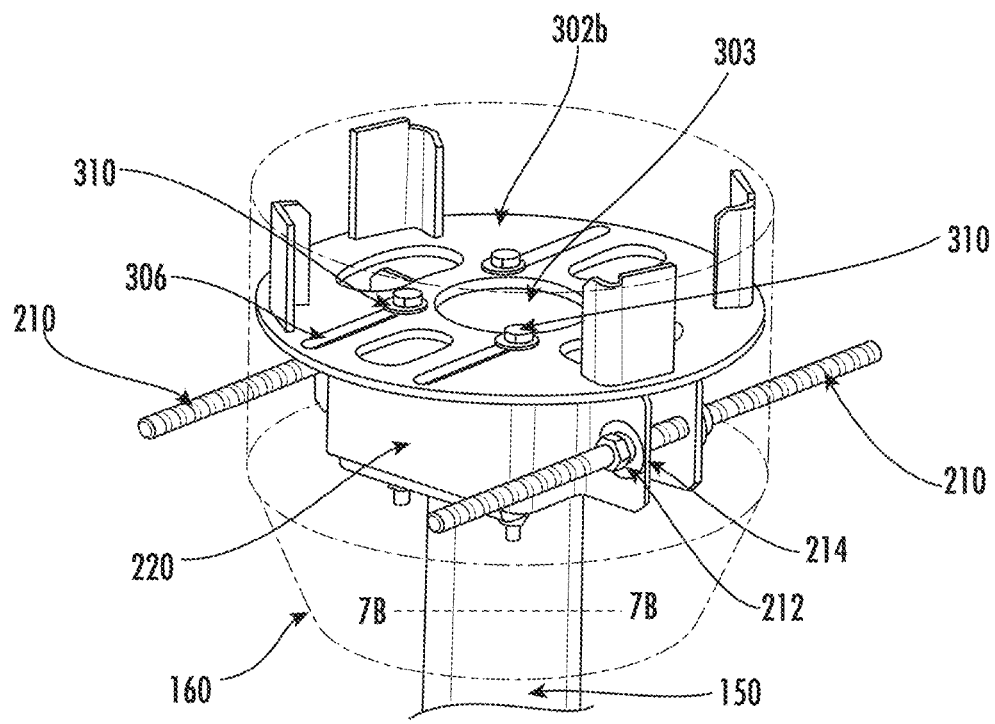
FIG. 7A is a perspective view of an adapter system according to embodiments of the present invention secured to a 3.5-inch square pole.
Figure 7B:
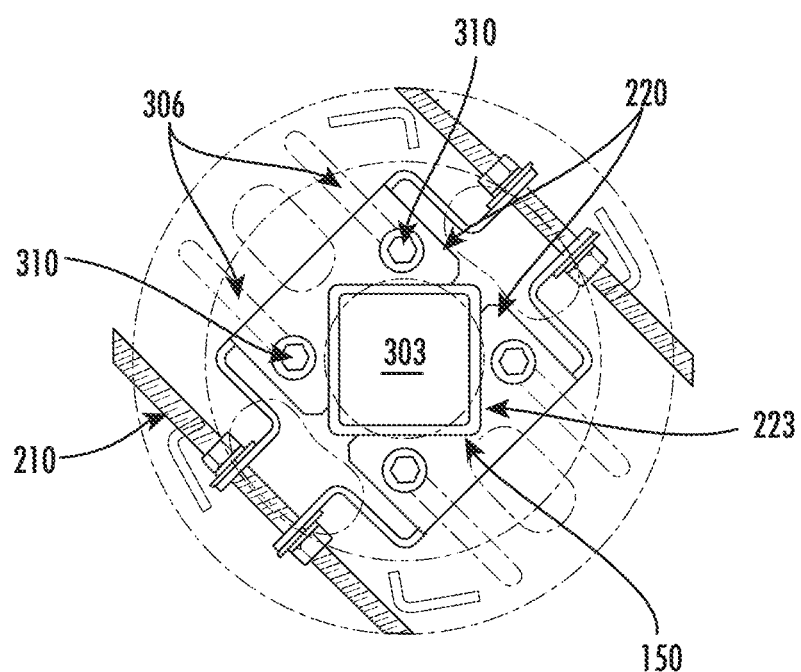
FIG. 7B is a bottom sectional view of the adapter system of FIG. 7A taken along line 7B-7B.
Figure 7C:
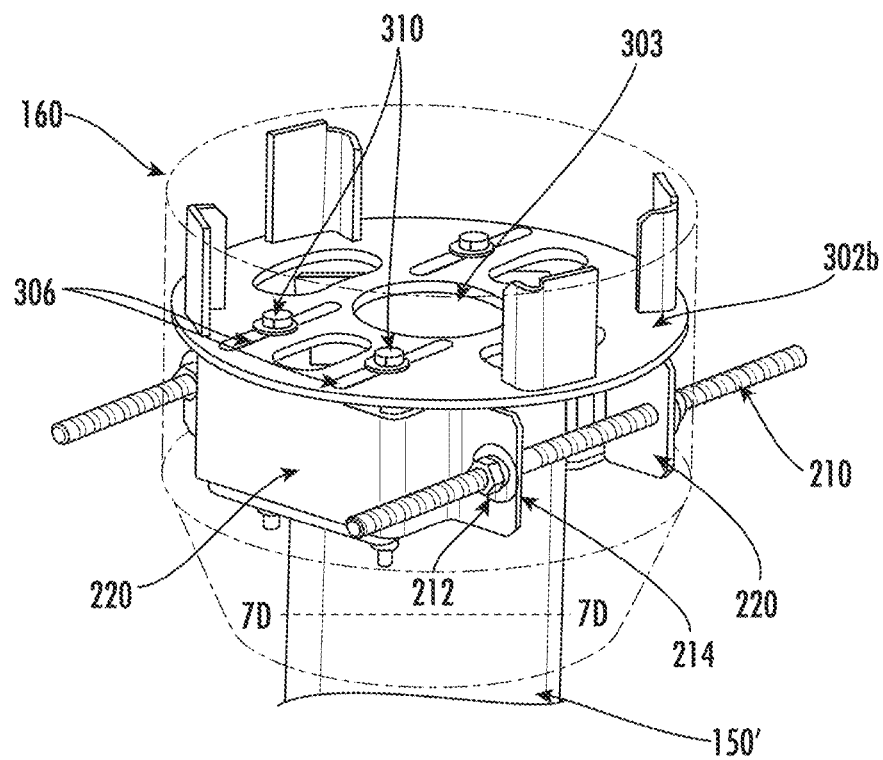
FIG. 7C is a perspective view of an adapter system according to embodiments of the present invention secured to a 6.0-inch square pole.
Figure 7D:
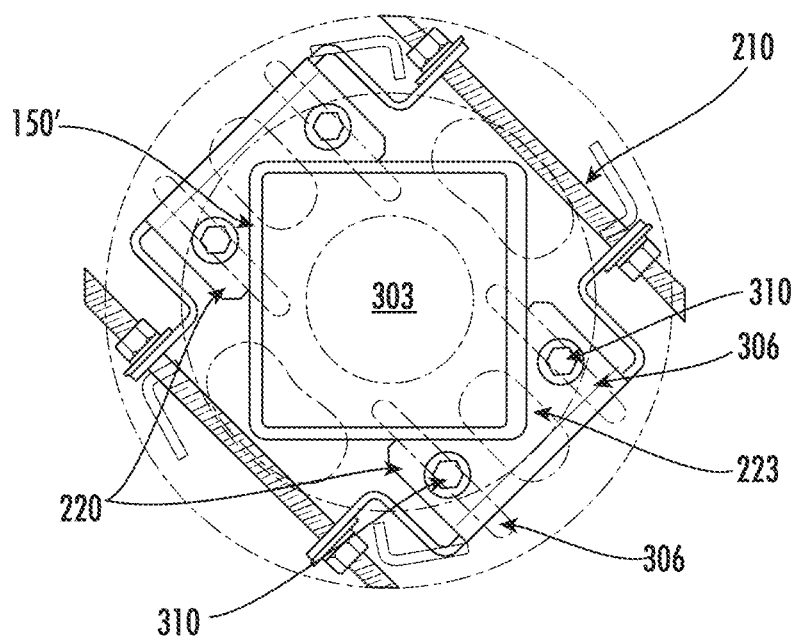
FIG. 7D is a bottom sectional view of the adapter system of FIG. 7C taken along line 7D-7D.
Figure 7E:
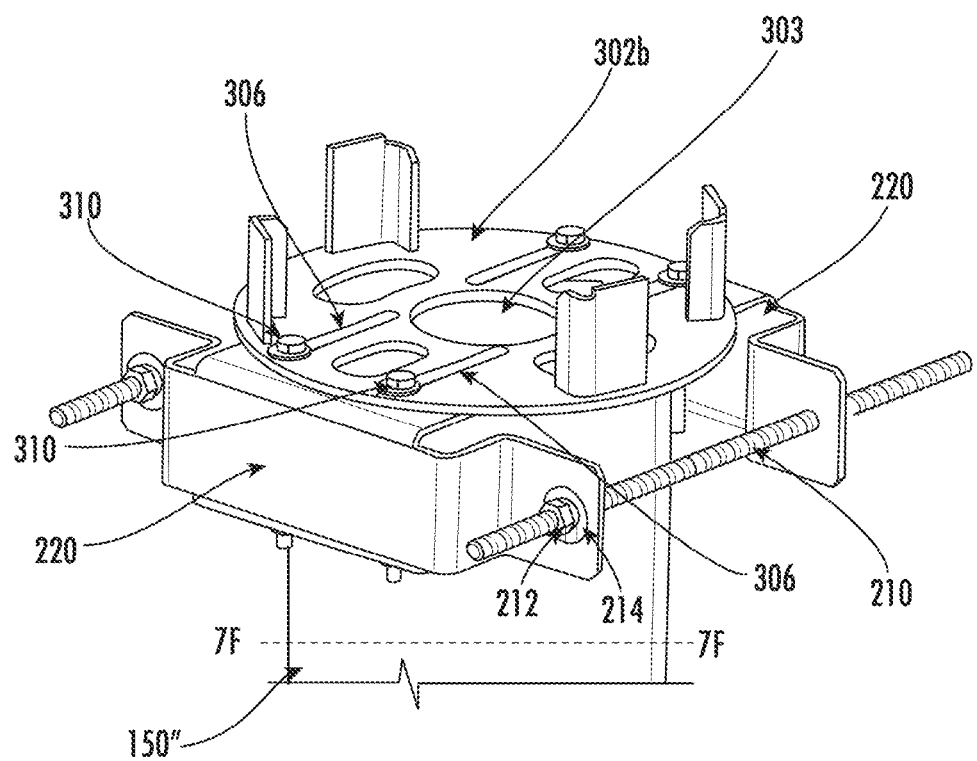
FIG. 7E is a perspective view of an adapter system according to embodiments of the present invention secured to an 8.5-inch square pole.
Figure 7F:
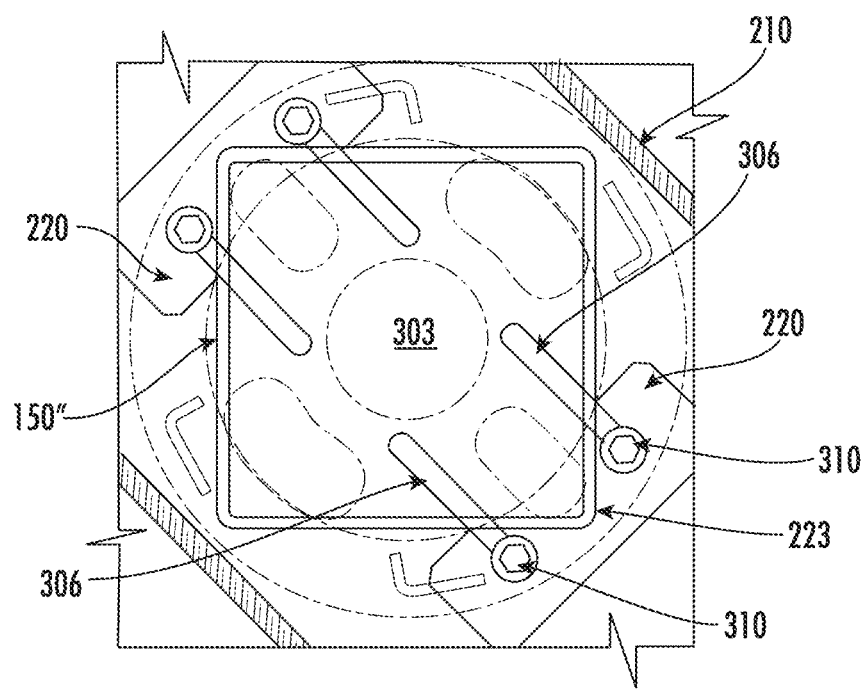
FIG. 7F is a bottom sectional view of the adapter system of FIG. 7E taken along line 7F-7F.

As shown in FIGS. 7A-7F, the fasteners 310 and slots 306 allow the square pole adapter system 100 to be adjustable, thereby allowing a pole top mount 300 to be secured to a range of different sized square mounting poles 150. For example, as illustrated in FIGS. 7A-7B, the square pole adapter system 100 may be used with a 3.5 inch square mounting pole 150. As shown in FIGS. 7A-7B, the smaller adapter 220 illustrated in FIGS. 2A-2B may be used and the fasteners 310 are slid to an interior end of the slots 306 (i.e., the end of the slot that is adjacent to the routing aperture 303 of the bottom mounting plate 302b). As illustrated in FIGS. 7C-7D, the square pole adapter system 100 may be used with a 6.0 inch square mounting pole 150. As shown in FIGS. 7C-7D, the smaller adapter 220 may be used and the fasteners 310 are slid to approximately the middle of the slots 306. As illustrated in FIGS. 7E-7F, the square pole adapter system 100 may be used with an 8.5 inch square mounting pole 150. As shown in FIGS. 7E-7F, the larger adapter 220' illustrated in FIGS. 3A-3B may be used and the fasteners 310 are slid to an exterior end of the slots 306 (i.e., the end that is adjacent to an outer periphery of the bottom mounting plate 302b).

Figure 8A:
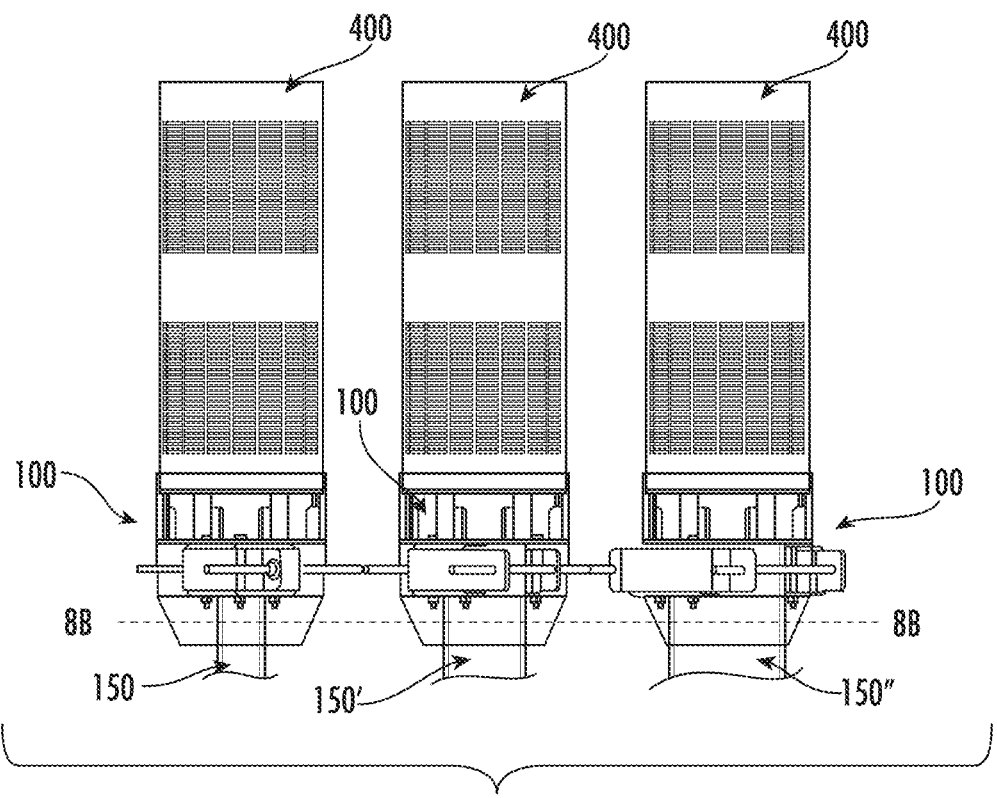
FIG. 8A is a side view of the 12-inch pole top adapter system assembly according to embodiments of the present invention secured to a 3.5-inch square pole, 6.0-inch square pole, and an 8.5-inch square pole (left to right).
Figure 9A:
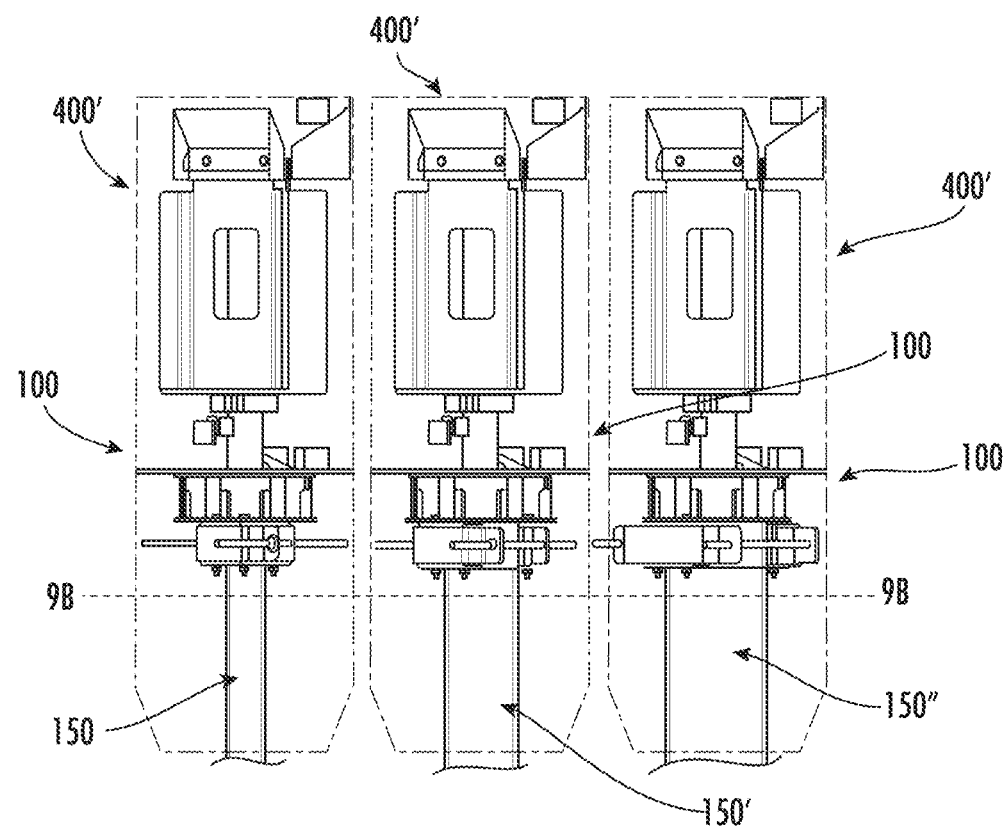
FIG. 9A is a side view of the 18-inch pole top adapter system assembly according to embodiments of the present invention secured to a 3.5-inch square pole, 6.0-inch square pole, and an 8.5-inch square pole (left to right).
Figure 9B:
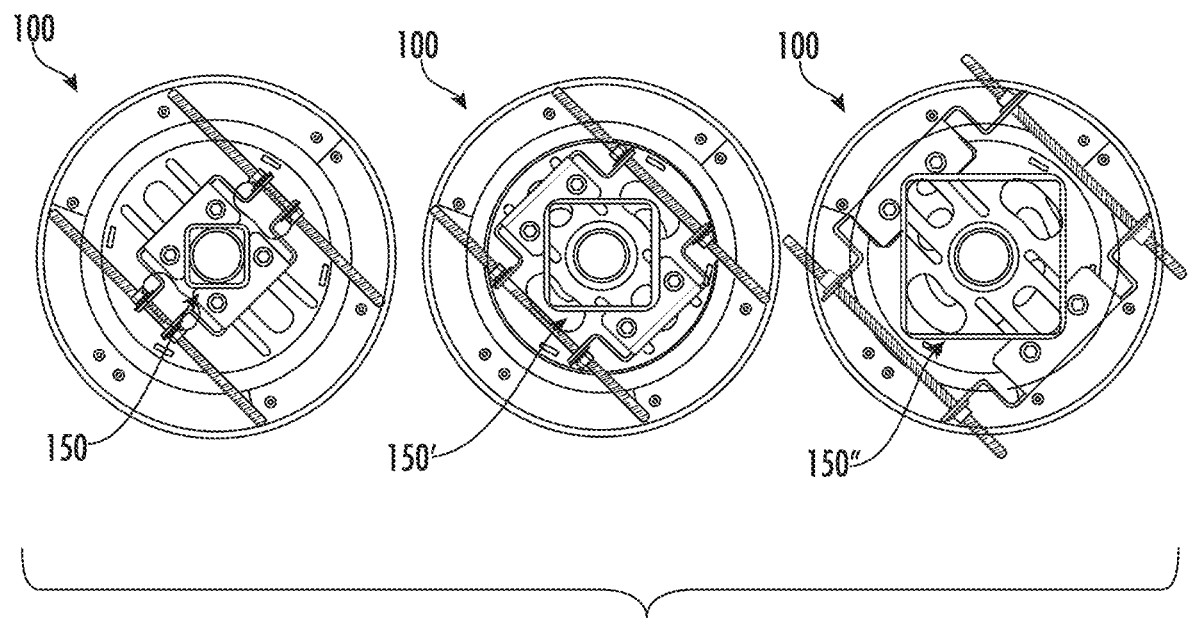
FIG. 9B is a bottom sectional view of each adapter system assembly of FIG. 9A taken along line 9B-9B.

Referring to FIGS. 8A-8B and FIGS. 9A-9B, after the square pole adapter system 100 is secured to a square mounting pole 150, a pole-top module for telecommunications equipment 400, 400' may be mounted and secured to the top mounting plate 302a of the pole top mount 300. FIGS. 8A-8B illustrate a pole-top module for telecommunications equipment 400 (e.g., antenna or radio) having a diameter of about 12 inches and secured on top of different sized square mounting poles 150 (i.e., shown from left to right: a 3.5 inch square mounting pole 150, a 6.0 inch square mounting pole 150', and a 8.5 inch square mounting pole 150"). FIGS. 9A-9B illustrate a pole-top module for telecommunications equipment 400' having a diameter of about 18 inches and secured on top of different sized square mounting poles 150 (i.e., shown from left to right: a 3.5 inch square mounting pole 150, a 6.0 inch square mounting pole 150', and a 8.5 inch square mounting pole 150").

As shown in FIGS. 7A, 8A, 9A, and 9B, in some embodiments, the square pole adapter system 100 may further include a transition cover 160. The transition cover 160 may be used to conceal the adapter kit 200 and/or pole top mount 300 when installed on top of a mounting pole 150. The transition cover 160 may provide an aesthetic transition from the mounting pole 150 to the pole-top module 400, 400' mounted on top of the pole 150.

Figure 10A:
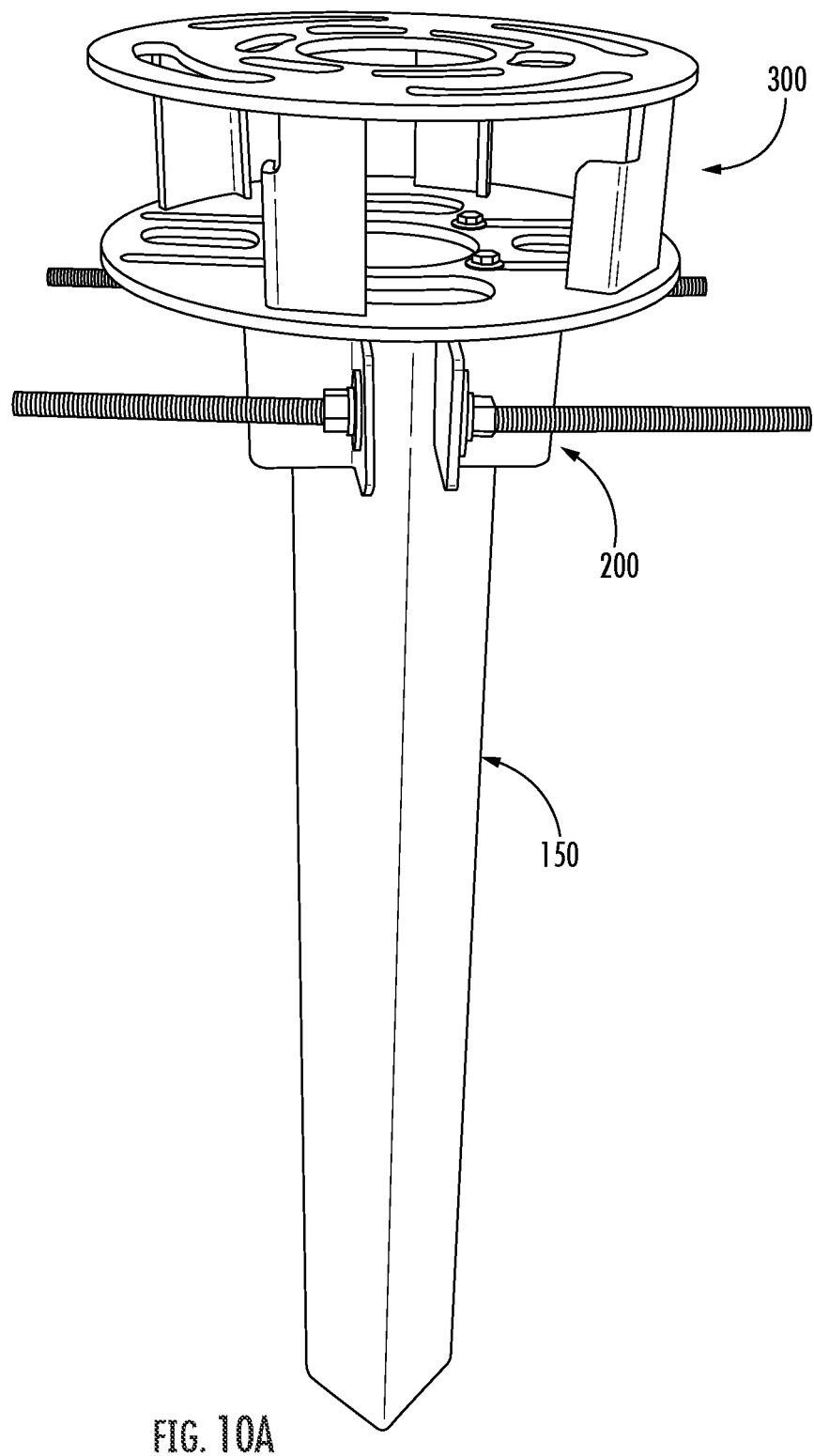
FIG. 10A is a photograph of an adapter system according to embodiments of the present invention secured to a square pole.
Figure 10B:
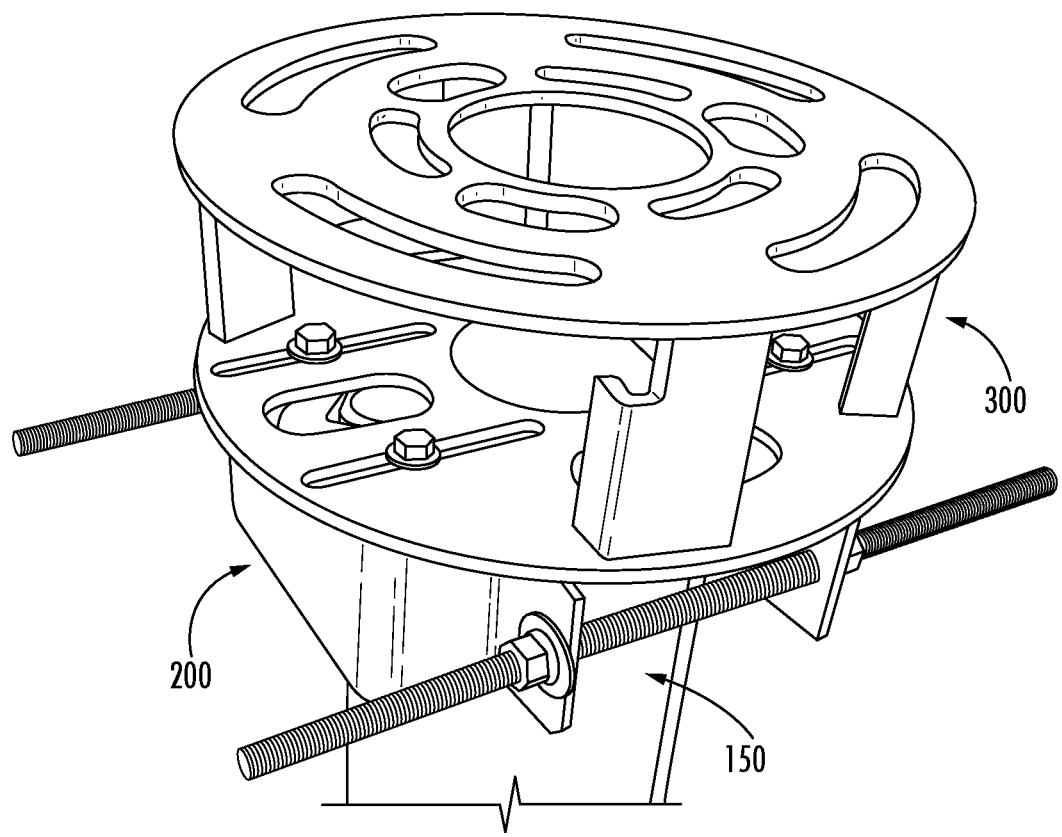
FIG. 10B is an enlarged photograph of the adapter system of FIG. 10A.
Figure 11:
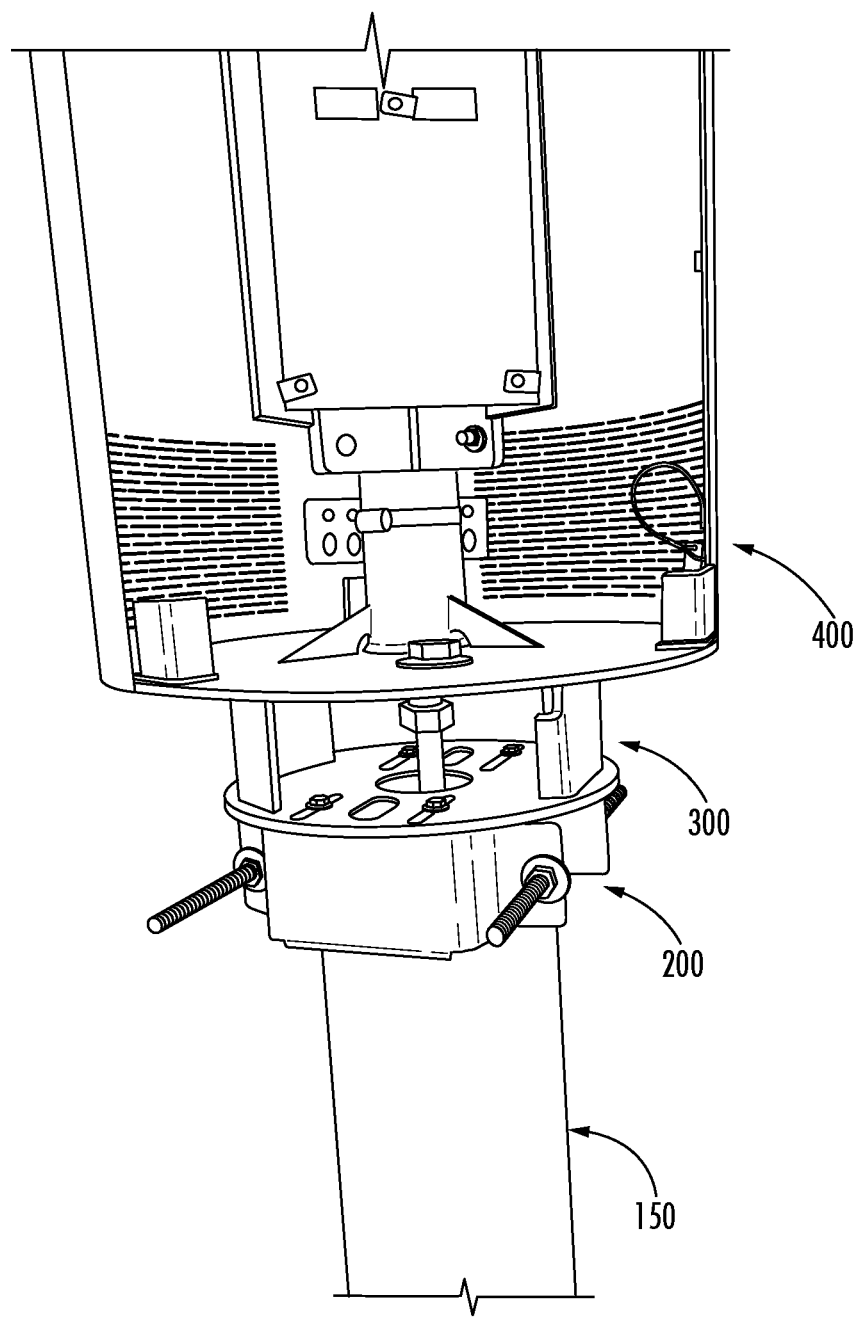
FIG. 11 is a photograph of an adapter system assembly according to embodiments of the present invention.

FIGS. 10A-10B are photographs showing an exemplary adapter system 100 (i.e., adapter kit 200 and pole top mount 300) secured to the top of a square mounting pole 150 according to embodiments of the present invention. FIG. 11 is a photograph showing an exemplary adapter system 100 secured to the top of a square mounting pole 150 and with a pole-top module for telecommunications equipment 400 mounted and secured to the adapter system 100 according to embodiments of the present invention.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A square pole adapter kit, comprising:
two threaded rods, wherein each thread rod has corresponding nuts and washers; and
two adapters, each adapter comprising:
a main body;
a top member integral with the main body and bent inwardly such that the top member extends generally perpendicularly to the main body, the top member comprising a triangular recess and a plurality of apertures, each aperture configured to receive a respective fastener from a pole top mount;
a bottom member integral with the main body and bent inwardly such that the bottom member extends generally perpendicularly to the main body and generally parallel with the top member, the bottom member comprising a triangular recess and a plurality of apertures, each aperture configured to receive the fastener from the pole top mount; and
a pair of flanges extending outwardly from opposing sides of the main body, each flange comprising an aperture sized and configured to receive a threaded rod,
wherein the triangular recesses of one adapter are sized and configured to receive a corner of a square mounting pole and the triangular recesses of the other adapter are sized and configured to receive an opposing corner of the square mounting pole.

2. The square pole adapter kit of claim 1, wherein the square mounting pole has dimensions in the range of about 3.5×3.5 inches to about 8.5 inches×8.5 inches.

3. The square pole adapter kit of claim 2, wherein the square mounting pole is 3.5 inches×3.5 inches, 6.0 inches× 6.0 inches, or 8.5 inches×8.5 inches.

4. The square pole adapter kit of claim 1, wherein the adapters are secured to a bottom mounting plate of the pole top mount by the fasteners.

5. The square pole adapter kit of claim 4, wherein the square pole adapter kit and the pole top mount are mounted and secured on top of the square mounting pole.

6. The square pole adapter kit of claim 5, wherein a pole-top module for telecommunications equipment is mounted and secured to a top mounting plate of the pole top mount.

7. A square pole adapter system, comprising:
a pole top mount, the mount comprising:
a top mounting plate having a first routing aperture located in the center of the plate and a first plurality of elongated apertures located circumferentially around the first routing aperture; and
a bottom mounting plate coupled to and spaced apart from the top mounting plate by a plurality of support members, the bottom mounting plate having a corresponding second routing aperture in the center of the plate and a second plurality of elongated apertures located circumferentially around the second routing aperture,
wherein the bottom mounting plate further comprises two pairs of elongated slots, each pair extending outwardly from opposing sides of the second routing aperture, each elongated slot being sized and configured to receive a fastener; and
a square pole adapter kit, the adapter kit comprising:
two threaded rods, wherein each thread rod has corresponding nuts and washers; and
two adapters, each adapter comprising:
a main body;
a top member integral with the main body and bent inwardly such that the top member extends generally perpendicularly to the main body, the top member comprising a triangular recess and a plurality of apertures, each aperture configured to receive the fastener from the bottom plate of the pole top mount;
a bottom member integral with the main body and bent inwardly such that the bottom member extends generally perpendicularly to the main body and generally parallel with the top member, the bottom member comprising a triangular recess and a plurality of apertures, each aperture configured to receive the fastener from the bottom plate of the pole top mount; and
a pair of flanges extending outwardly from opposing sides of the main body, each flange comprising an aperture sized and configured to receive a threaded rod,
wherein the triangular recesses of the adapters face each other, and wherein the triangular recesses of one adapter are sized and configured to receive a corner of a square mounting pole and the triangular recesses of the other adapter are sized and configured to receive an opposing corner of the square mounting pole,
wherein each fastener is inserted through a slot in the bottom mounting plate of the pole top mount and corresponding apertures in the top and bottom members of an adapter, thereby securing the adapters to the bottom mounting plate of the pole top mount.

8. The square pole adapter system of claim 7, wherein the square mounting pole has dimensions in the range of about 3.5×3.5 inches to about 8.5 inches×8.5 inches.

9. The square pole adapter system of claim 8, wherein the square mounting pole is 3.5 inches×3.5 inches, 6.0 inches× 6.0 inches, or 8.5 inches×8.5 inches.

10. The square pole adapter system of claim 7, wherein the top mounting plate of the pole top mount is sized and configured to secure a pole-top module for telecommunications equipment having a diameter in the range of about 12 inches to about 18 inches.

11. The square pole adapter system of claim 7, wherein a pole-top module for telecommunications equipment is mounted and secured to a top mounting plate of the pole top mount.

12. The square pole adapter system of claim 7, wherein the fasteners are configured to slide within the elongated slots, thereby allowing the adapters to be adjustable to fit around different sized square mounting poles.

13. A square pole adapter system assembly, comprising:
   a square mounting pole;
   a pole top mount, the mount comprising:
      a top mounting plate having a first routing aperture located in the center of the plate and a first plurality of elongated apertures located circumferentially around the first routing aperture; and
      a bottom mounting plate coupled to and spaced apart from the top mounting plate by a plurality of support members, the bottom mounting plate having a corresponding second routing aperture in the center of the plate and a second plurality of elongated apertures located circumferentially around the second routing aperture,
      wherein the bottom mounting plate further comprises two pairs of elongated slots, each pair extending outwardly from opposing sides of the second routing aperture, wherein a fastener is inserted through each elongated slot; and
   a square pole adapter kit, the adapter kit comprising:
      two threaded rods, wherein each thread rod has corresponding nuts and washers; and
      two adapters, each adapter comprising:
         a main body;
         a top member integral with the main body and bent inwardly such that the top member extends generally perpendicularly to the main body, the top member comprising a triangular recess and a plurality of apertures, each aperture receives a respective fastener extending from the bottom plate of the pole top mount;
         a bottom member integral with the main body and bent inwardly such that the bottom member extends generally perpendicularly to the main body and generally parallel with the top member, the bottom member comprising a triangular recess and a plurality of apertures, each aperture receiving a respective fastener extending from the bottom plate of the pole top mount and through the apertures of the top member, thereby securing the adapters to the pole top mount; and
         a pair of flanges extending outwardly from opposing sides of the main body, each flange comprising an aperture that receives a threaded rod,
      wherein the triangular recesses face each other, and wherein the triangular recesses of one adapter receive a corner of the square mounting pole and the triangular recesses of the other adapter receive an opposing corner of the square mounting pole, and wherein the corresponding nuts and washers are tightened on the respective threaded rod and against the flanges of the adapters, thereby securing the square pole adapter kit to the square mounting pole.

14. The square pole adapter system assembly of claim 13, wherein the square mounting pole has dimensions in the range of about 3.5×3.5 inches to about 8.5 inches×8.5 inches.

15. The square pole adapter system assembly of claim 14, wherein the square mounting pole is 3.5 inches×3.5 inches, 6.0 inches×6.0 inches, or 8.5 inches×8.5 inches.

16. The square pole adapter system assembly of claim 13, wherein the top mounting plate of the pole top mount is sized and configured to secure a pole-top module for telecommunications equipment having a diameter in the range of about 12 inches to about 18 inches.

17. The square pole adapter system assembly of claim 13, wherein a pole-top module for telecommunications equipment is mounted and secured to a top mounting plate of the pole top mount.

18. The square pole adapter system assembly of claim 13, wherein the fasteners are configured to slide within the elongated slots, thereby allowing the adapters to be adjustable to fit around different sized square mounting poles.

* * * * *